United States Patent [19]

Miura et al.

[11] Patent Number: 4,695,319

[45] Date of Patent: Sep. 22, 1987

[54] METAL DISTILLATION METHOD UTILIZING DOUBLE VAPORIZATION

[75] Inventors: Hirohisa Miura; Hiroshi Satoh; Toshio Natsume; Hidenori Katagiri, all of Toyota, Japan

[73] Assignee: Toyota Jidosha Kabushiki Kaisha, Toyota, Japan

[21] Appl. No.: 759,309

[22] Filed: Jul. 26, 1985

[30] Foreign Application Priority Data

Nov. 30, 1984 [JP] Japan .................. 59-253417

[51] Int. Cl.$^4$ ............................ C22B 26/22
[52] U.S. Cl. ...................... 75/63; 75/10.33; 75/67 A
[58] Field of Search ........... 75/67 R, 67 A, 63, 10.18, 75/10.33; 266/150

[56] References Cited

U.S. PATENT DOCUMENTS 4,488,904 12/1984 Miura et al. .................. 75/67 R

Primary Examiner—Melvyn J. Andrews
Attorney, Agent, or Firm—Oblon, Fisher, Spivak, McClelland & Maier

[57] ABSTRACT

A method for separating a certain metal from a raw material including a mixture of the metal and an element which has a lower vapor pressure than the metal. The raw material including the mixture of the metal and the element is heated so as to cause a first vapor including the metal to be evolved. This first vapor is passed through a throttling means in which it undergoes adiabatic expansion and is rapidly cooled so that at least part of it is reduced to a liquid containing the metal. This liquid is reheated so as to cause a second vapor including the metal to be evolved. And the second vapor is cooled to collect the metal. An apparatus is also disclosed for performing this method.

8 Claims, 4 Drawing Figures

METAL DISTILLATION METHOD UTILIZING DOUBLE VAPORIZATION

BACKGROUND OF THE INVENTION

The present invention relates to the field of metal refining, and in particular relates to a method and apparatus for distilling a metal which it is desired to recover from a mixture of said metal and another element which has a relatively lower vapor pressure than said metal at a relatively high temperature.

The present patent application has been at least partially prepared from material which has been included in Japanese Patent Application No. Sho 59-253417 (1984), which was invented by the same inventors as the present patent application, and the present patent application hereby incorporates the text of that Japanese Patent Application and the claims in the drawings thereof into this specification by reference; a copy is appended to this specification.

There exists in the art a reasonably effective process for separating such a metal as magnesium or zinc from a molten alloy consisting of a magnesium or zinc component, which has a relatively high vapor pressure at a relatively high temperature, and a second element such as lead or aluminum, which has a relatively low vapor pressure at said relatively high temperature. The technique takes advantage of the difference in vapor pressure of the components of the molten metal alloy by distilling said alloy in a vacuum. This technique is the so called "Vacuum Distilling Method", or alternatively the "Volatilization Method". (See "Compendium of Metals", revised edition, published by Maruzen, pages 324–330). The distilling apparatus required to execute this method normally comprises: a vaporization container consisting of an internal sealed chamber with a molten alloy introduction port and a separate vapor removal port; a condenser consisting of an internal sealed chamber with a vapor introduction port and a separate discharge port; a connecting conduit linking the vapor removal port of the vaporization container to the vapor introduction port of the condenser; and a means for heating the inside of the vaporization container to a certain fixed temperature; said means heating the molten alloy introduced to the vaporization container and causing said molten alloy to vaporize and, further, causing the metal vapor thus formed to travel to the condenser through the connecting conduit linking the evaporation container and said condenser; said condenser, in addition to the above stated features, comprising an internal vessel which, when cooled, causes the metal vapor introduced thereto to condense.

However, in a process and apparatus of the above described kind, when the viscosity of the metal desired to be recovered is low or when the difference between the vapor pressures of the respective components of the metal alloy to be treated is not sufficiently great, the process must be executed numerous times in order to achieve a high degree of purity for the metal desired to be recovered. An alternative to this prior art type of method is the New Jersey Process (reference should be made to the publication "Non-ferrous Metal Refining", The Metals Academic Society, p. 129) for refining rough zinc, wherein a distilling tower of fifty stories or more is necessary, the expenditure of energy is great, the distilling process itself requires excessive time, and the required apparatus is of large size. With either of the two above mentioned processes, it is impossible to distil metals cheaply and efficiently.

SUMMARY OF THE INVENTION

Accordingly, it is the primary object of the present invention to provide a method for thus separating a metal, and a device for performing the method, which avoid the above mentioned disadvantages.

It is a further object of the present invention to provide such a method for thus separating a metal, and a device for performing the method, which do not require numerous process repetitions.

It is a further object of the present invention to provide such a method for thus separating a metal, and a device for performing the method, which are effective, even when the viscosity of the metal desired to be separated is low.

It is a further object of the present invention to provide such a method for thus separating a metal, and a device for performing the method, which are effective, even when the difference between the vapor pressures of the various components of the raw material alloy to be treated is not very great.

It is a further object of the present invention to provide such a method for thus separating a metal, and a device for performing the method, which are economical.

It is a yet further object of the present invention to provide such a method for thus separating a metal which does not require any very large apparatus, and a device for performing the method which is not very large.

It is a yet further object of the present invention to provide such a method for thus separating a metal, and a device for performing the method, which are not excessively slow.

It is a yet further object of the present invention to provide such a method for thus separating a metal, and a device for performing the method, which are not very demanding in terms of energy cost.

According to the most general method aspect of the present invention, these and other objects are accomplished by a method for separating a certain metal from a raw material including a mixture of said certain metal and an element which has a lower vapor pressure than said certain metal, wherein: (a) said raw material including said mixture of said certain metal and said element is heated so as to cause a first vapor including said certain metal to be evolved; (b) said first vapor is passed through a throttling means in which it undergoes adiabatic expansion and is rapidly cooled so that at least part of it is reduced to a liquid containing said certain metal; (c) said liquid is reheated so as to cause a second vapor including said certain metal to be evolved; and (d) said second vapor is cooled to collect said certain metal.

According to such a method, the first vapor is created from the raw material by the step (a) wherein the certain metal desired to be recovered is selectively vaporized from the molten raw material, resulting in the formation of a first vapor high in content of said certain metal. This first vapor is then liquefied according to the step (b), wherein said first vapor including said certain metal undergoes adiabatic expansion caused by passing it through the throttling means, which forces its rapid cooling to liquefaction. A second vapor of even greater concentration of said certain metal desired to be recovered is then produced according to the step (c), wherein, utilizing principally the heat created by the passing of said first vapor of said certain metal from the vapor phase to the liquid phase, the liquid is once again vaporized. This second vapor is cooled and the certain metal is collected from the results. The distillation of the molten raw material thus occurs twice in rapid succession. The liquefaction of the first vapor is executed quickly by passing the vapor through a throttled passage, whereupon it undergoes adiabatic expansion resulting in its rapid cooling. The second vaporization is not achieved by applying a powerful external heat source to the adiabatically cooled liquid but by using principally the heat the liquid retains as it passes from the vapor phase to the liquid phase, and also by using heat recovered from the kinetic energy of the jet output from the throttling means. Therefore it is possible, according to the distillation method of this invention, to recover the desired certain metal in highly pure form both cheaply and efficiently.

Further, according to the most general apparatus aspect of the present invention, these and other objects are accomplished by an apparatus for separating a certain metal from a raw material including a mixture of said certain metal and an element which has a lower vapor pressure than said certain metal, comprising: (a) a first chamber means for holding said raw material including said mixture of said certain metal and said element for heating up so as to cause a first vapor including said certain metal to be evolved; (b) a throttling means for passing said first vapor through so as to cause it to undergo adiabatic expansion and to be rapidly cooled so that at least part of it is reduced to a liquid containing said certain metal; (c) a second chamber means for holding said liquid for reheating so as to cause a second vapor including said certain metal to be evolved; and (d) a means for cooling down said second vapor to collect said certain metal.

According to such an apparatus, the vaporization of the molten alloy is executed twice in succession by a single apparatus. Descending temperature conditions are provided, according to which the inside of the first chamber means has a higher temperature and therefore a greater internal pressure than the second chamber means, and the second chamber means has a higher temperature and greater pressure than the cooling down means, thus causing vapor to pass from the first chamber means to the second chamber means, and from the second chamber means to the cooling down means, promptly and automatically. Therefore the distillation method of the present invention is very effectively implemented by utilizing the apparatus. Further, as compared to the above described New Jersey Process requiring a multiple storied vaporization tower, the apparatus of the present invention can be built simply and compactly.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purpose of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENTS

The present invention will now be described with reference to the preferred embodiments thereof, and with reference to the appended drawings.

The First Apparatus Embodiment

Figure 1:
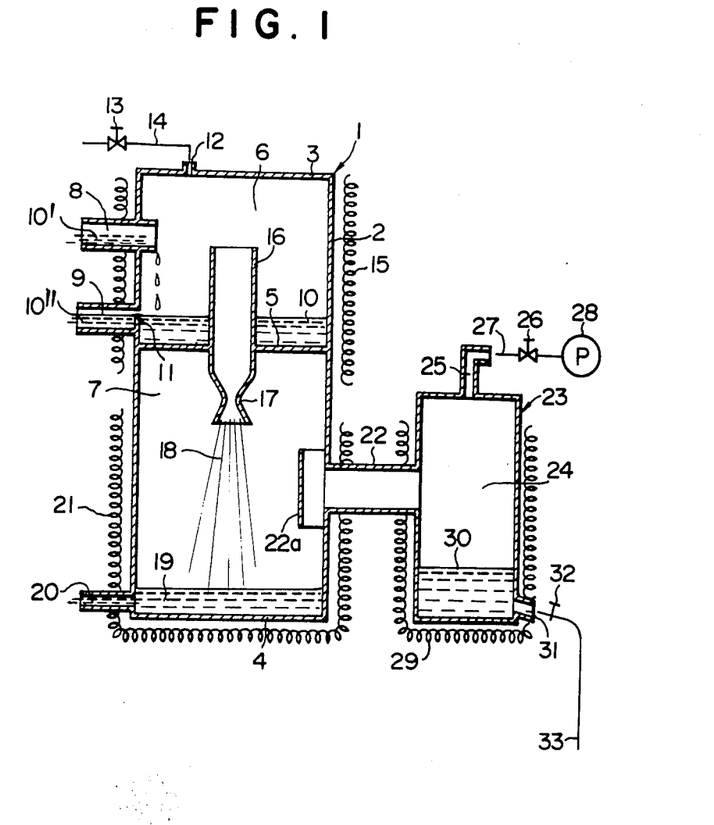
FIG. 1 is a schematic vertical sectional view of the first preferred embodiment of the apparatus aspect of the present invention, which incorporates a fan shaped nozzle.

FIG. 1 is a schematic vertical sectional view of the first preferred embodiment of the apparatus aspect of the present invention. In this figure, the reference numeral 1 denotes a housing, which has a cylindrical side wall portion 2, a ceiling wall portion 3 which seals the top end of said cylindrical wall portion 2, and a bottom wall portion 4 which seals the bottom end of said cylindrical wall portion 2. The internal space thus defined within the housing 1 is divided by a separation wall 5 into an upper chamber 6, hereinafter termed the first vaporization chamber, and a lower chamber 7, hereinafter termed the second vaporization chamber. Thus, the separation wall 5 defines the lower boundary of said first vaporization chamber 6 and the upper boundary of said second vaporization chamber 7. The first vaporization chamber 6 is smaller in volume than the second vaporization chamber 7.

Into the upper first vaporization chamber 6 there open a molten alloy introduction port 8 at an upper portion thereof, and a molten alloy discharge port 9 at a lower portion thereof, said ports 8 and 9 being formed integrally with the side wall portion 2 of the housing 1. A dam member 11 is provided at the point where said molten alloy discharge port 9 opens to the first vaporization chamber 6. Thus, during use of this apparatus, molten alloy 10' is introduced into the first vaporization chamber through the molten alloy introduction port 8, and drips down thereinto to form a pool 10 of molten alloy material as shown in the figure. Then, particularly in the case that the concentration of the metal which is desired to be recovered in said molten alloy 10 is low and therefore the concentration of non-desired impurities in said molten alloy 10 is high, the molten alloy in this pool 10 overflows over the dam member 11 and enters into the molten alloy discharge port 9, to pass to the outside.

In the ceiling wall portion 3 which seals the top end of the cylindrical wall portion 2 there is formed an inert gas introduction port 12, to which a conduit 14 is connected; this conduit is controlled by a flow control valve 13 fitted at an intermediate point thereof. During use of the apparatus, an inert gas such as argon is introduced as needed from a source such as a gas cylinder (not shown in the figures) connected to the other end of the conduit 14, and thus passes through the inert gas introduction port 12 into the first vaporization chamber 6 at a flow volume determined by the setting of the flow control valve 13. Furthermore, a first heater 15 is arranged around the circumferential side wall of the first vaporization chamber 6, said first heater 15 providing a means for heating up said first vaporization chamber 6 and the molten alloy pool 10 received therein to a temperature such as a temperature T1 which will be defined later, and for maintaining said chamber 6 and said alloy pool 10 at said temperature T1, by which means a first metal vapor (not shown) is created within the upper first vaporization chamber 6.

Through the separation wall 5 which divides the upper first vaporization chamber 6 from the lower second vaporization chamber 7, there is formed an aperture in which there is integrally set a communicating conduit 16, in the lower end portion of which there is defined a flattened fan shaped nozzle 17. The upper end of the communicating conduit 16 projects upwards into the upper first vaporization chamber 6 from its floor and opens at a considerable height therein, substantially higher than the level of the top of the dam member 11, so as to be definitely above the level of the molten alloy pool 10 received therein. And the lower end of the communication conduit 16 opens at a relatively high point within the lower second vaporization chamber 7. Thus, the communicating conduit 16 and the nozzle 17 together define a constricted conduit means. The first metal vapor (not shown) produced as explained above in the upper first vaporization chamber 6 flows, possibly with the admixture thereto of a flow of an inert gas such as argon injected as explained above through the inert gas introduction port 12 into said first vaporization chamber 6, into the upper end of the communicating conduit 16, and then flows through said conduit 16 in the downwards direction in the figure, while undergoing adiabatic expansion. This flow of metal vapor and possibly inert gas admixed thereto then passes through the fan shaped nozzle 17, undergoing further and rapid adiabatic expansion as it does so, and sprays from said fan shaped nozzle 17 into the lower second vaporization chamber 7 as a jet spray flow 18. During this further rapid adiabatic expansion of the flow of metal vapor and possibly inert gas admixed thereto through the fan shaped nozzle 17, the metal vapor thereof is cooled rapidly to a liquid spray form, said liquid spray having a larger concentration of the metal which is desired to be recovered and therefore a smaller concentration of non desired impurities, as compared with the alloy originally introduced to the first vaporization chamber 6 through the molten alloy introduction port 8; in other words, the alloy of the spray 18 is enriched.

This enriched liquid alloy collects in a molten pool 19 at the bottom portion of the lower second vaporization chamber 7, and can selectively be withdrawn therefrom through a molten alloy discharge port 20 formed integrally with the side wall portion 2 of the housing 1 at a lower portion thereof. The thus withdrawn molten alloy in the pool 19 in said lower second vaporization chamber 7 may typically in fact be recirculated to be passed through the molten alloy introduction port 8 into the upper first vaporization chamber 6 to be recycled together with a admixture of fresh alloy as the aforementioned molten alloy supply 10'; but, also, a second heater 21 is provided as arranged around the circumferential side wall and around the bottom of the second vaporization chamber 7, and this second heater 21 is arranged to supply a certain fairly moderate required amount of heat to said lower second vaporization chamber 7 and to the molten alloy pool 19 therein, so as to maintain it at a temperature T2, this temperature T2 being lower than the aforementioned temperature T1 at which the alloy pool 10 in the upper first vaporization chamber 6 is maintained by the heater 15. This temperature T2 is enough to vaporize a proportion of said molten alloy pool 19, to form a second vapor (again not particularly shown in the figure). Thus, it is seen that said molten alloy pool 19 at the bottom of said lower second vaporization chamber 7 is supplied with heat from a plurality of sources: first, it receives heat from the jet spray 18, including heat produced by the adiabatic expansion of said jet spray 18 and heat resulting from the passing of the metal vapor included therein from the vapor phase to the liquid phase; secondly, it receives heat produced from the absorption of the kinetic energy of said jet spray 18; and, thirdly, it receives supplemental heat from the second heater 21. Accordingly, it is seen that the heat received by said molten alloy pool 19 from the second heater 21 is only required in a fairly low amount as a supplement, and the power used by the second heater 21 is quite low as compared, for instance, with the power used by the first heater 15.

Through the cylindrical wall portion 2 which defines the side of the lower second vaporization chamber 7 there is formed an aperture to which there is integrally connected one end of a communicating conduit 22, the other end of which is connected to an aperture formed in the side of a cylindrical condenser 23 and opening to a condensation chamber 24 defined therein at a considerable height in said chamber 24. A buffer 22a is positioned inside the lower second vaporization chamber 7 against said aperture which opens to the communicating conduit 22, so as to prevent any portion of the jet spray 18 from directly entering into said communicating conduit 22; thus, only the aforementioned second vapor, and not the jet spray 18, can enter into said conduit 22 to travel theredown into the condensation chamber 24 of the condenser 23. Into the condensation chamber 24 there open a vapor discharge port 25 at an upper portion thereof, and a molten alloy discharge port 31 at a lower portion thereof, said ports 25 and 31 being formed integrally with the side wall portion of the condenser 23. To the vapor discharge port 25 there is connected a conduit 27; this conduit 27 is controlled by a flow control valve 26 fitted at an intermediate point thereof. A vacuum pump 28 is connected to the other end of this conduit 27. During use of the apparatus, the vacuum pump 28 is continuously operated, and this decompresses the interior of the condensation chamber 24 of the condenser 23, and thereby via the communicating conduit 22 also the lower second vaporization chamber 7 and the upper first vaporization chamber 6 communicated therewith via the communicating conduit 16 are exhausted. And the production of the first vapor in the upper first vaporization chamber 6 continues, along with the production of the second vapor in the lower second vaporization chamber 7; and, bearing in mind that, in the case of operation with admixture of inert gas, such inert gas such as argon is further passing through the inert gas introduction port 12 into the first vaporization chamber 6 at a flow volume determined by the setting of the flow control valve 26, therefore, the pressures of the upper first vaporization chamber 6, the lower second vaporization chamber 7, and the condensation chamber 24 are respectively maintained at pressure values P1, P2, and P3; and P1 is greater than P2, while P3 is approximately equal to P2 or is slightly less than it. And the temperature T3 in the condensation chamber 24 is maintained to be substantially less than the temperature T2 of the lower second vaporization chamber 7, by air cooling the condenser 23.

Thus, according to the above described temperature and pressure drops from the lower second vaporization chamber 7 to the condensation chamber 24, the second metal vapor (not shown) produced as explained above in said lower second vaporization chamber 7 flows, possibly with the admixtured inert gas such as argon injected as explained above through the inert gas introduction port 12 into the first vaporization chamber 6 and admixed therewith, into the left end in the figure of the communicating conduit 22, and then flows through said conduit 22 in the rightwards direction in the figure, into the condensation chamber 24. This vapor is then cooled inside the condenser 23 to form a liquid, and solid metal comprising essentially only the metal desired to be recovered in a highly pure form is left adhering to the inner walls of the condenser 23.

Also, a third heater 29 is provided as arranged around the circumferential side wall and around the bottom of the condensation chamber 24, and this third heater 29 is arranged to supply a proper amount of heat to said condensation chamber 24 to melt said solid metal comprising essentially only the metal desired to be recovered in a highly pure form left as described above adhering to the inner walls of the condenser 23. This metal thereby is melted and trickles down to the bottom of the condenser 23, to form a pool 30 of molten metal. The molten alloy discharge port 31 connected to the bottom portion of the condenser 23 is for removing this molten metal in the pool 30, and to said port 31 there is connected the upper end of a fairly long discharge conduit 33, at an intermediate portion of which a control valve 32 is fitted. The discharge conduit 33 extends sufficiently far downwards to give good head for sucking out molten metal from the molten metal pool 30 to the atmosphere, selectively according to the opening and closing of the control valve 32, against a high vacuum value which may be present in the condensation chamber 24. Accordingly, the selective removal of molten metal from the pool 30 thereof in the condenser 23 may be accomplished without substantially disturbing the evacuated condition of the condensation chamber 24 and of the apparatus as a whole.

Operation of the First Apparatus Embodiment

The first preferred embodiment of the metal distillation method of the present invention is performed in the manner which will now be described, by using the above described first preferred embodiment of the metal distillation apparatus of the present invention.

First, the control valve 32 for controlling taking out of metal from the condenser 23 is closed, and, in the case of vacuum operation, the control valve 13 for controlling inflow of inert gas is also closed, whereas, in the case of operation with a flow of inert gas such as argon, a gas cylinder (not shown) is connected to the end of the conduit 14, and the control valve 13 is properly adjusted to give an appropriate flow of such inert gas. Also, the operation of the vacuum pump 28 is started, and the control valve 26 therefor is regulated, thus exhausting the apparatus through the vapor discharge port 25 and through the conduit 27. In the case of vacuum operation, therefore, the interior of the apparatus soon becomes substantially exhausted of air; while, in the case of operation with a flow of inert gas, such a gas flow through the conduit 14, the inert gas introduction port 21, the first vaporization chamber 6, the connecting conduit 16 and the nozzle 17, the second vaporization chamber 7, the connecting conduit 22, the condensation chamber 24, the vapor discharge port 25 and through the conduit 27 soon becomes established, with the original air in the apparatus having been purged and swept out, and with the pressures in the first vaporization chamber 6, the second vaporization chamber 7, and the condensation chamber 24 respectively being maintained as approximately equal to P1, P2, and P3. And electric power is supplied to the first, second, and third heaters 15, 21, and 29, thus bring the temperatures in the first vaporization chamber 6, the second vaporization chamber 7, and the condensation chamber 24 respectively to be approximately equal to T1, T2, and T3.

Next, a quantity 10' of molten metal alloy, containing a certain concentration of a first metal which it is desired to recover and also containing a certain concentration of a second element of lower vapor pressure than said first metal, is introduced into the first vaporization chamber through the molten alloy introduction port 8, and drips down thereinto to form a pool 10 of molten alloy material as shown in the figure. This pool 10 is heated by the action of the heater 15 to the temperature T1, and evolves a first metal vapor, which has a higher percentage concentration of said first metal which it is desired to recover than did the original molten metal alloy. This first metal vapor, if in fact inert gas is passing through the inert gas introduction port 12 into the first vaporization chamber 6, mixes with said inert gas to form a mixture at a proportion determined by the flow volume determined by the setting of the flow control valve 13. Thus, in the upper first vaporization chamber 6, the pressure P1 is maintained, as well as the above mentioned temperature T1. The first metal vapor then (possibly with the admixture thereto of the above mentioned flow in inert gas) flows into the upper end of the communicating conduit 16, and then flows through said conduit 16 in the downwards direction in the figure while undergoing adiabatic expansion. This flow of metal vapor and possibly inert gas admixed thereto then passes through the fan shaped nozzle 17, undergoing further and rapid adiabatic expansion as it does so, and sprays from said fan shaped nozzle 17 into the lower second vaporization chamber 7 as the jet spray flow 18. During this further rapid adiabatic expansion of this flow of metal vapor and possibly inert gas admixed thereto through the fan shaped nozzle 17, and metal vapor thereof is cooled rapidly to a liquid spray form, said liquid spray, like the first vapor from which it is formed, having a larger concentration of the metal which is desired to be recovered, and therefore a smaller concentration of non desired impurities, as compared with the alloy 10' originally introduced to the first vaporization chamber 6 through the molten alloy introduction port 8; in other words, the alloy of the spray 18 is enriched.

This enriched liquid alloy strikes against the bottom wall 4 of the second vaporization chamber 7, or against an already collected molten pool 19 of said liquid alloy at the bottom portion of the lower second vaporization chamber 7. The sensible heat evolved by the molten alloy 19 as it converts from the liquid phase in the first vaporization chamber 6 to the liquid phase in the second vaporization chamber 7 becomes the principal source of heat for vaporizing this pool 19 of molten alloy, and thus a certain amount of said pool 19 of molten alloy is reconverted into vapor, to form a second vapor in the second vaporization chamber 7. However, some heating assistance is also required from the second heater 21 for forming this second vapor; and some contribution is as mentioned above received from the heat produced from the absorption of the kinetic energy of the jet spray 18. And this second vapor has an even higher concentration of the metal which is desired to be recovered, and therefore an even smaller concentration of non desired impurities. The remainder of the matter in the molten alloy pool 19 can be from time to time withdrawn therefrom through the molten alloy discharge port 20, and as mentioned above may in fact be recirculated. Thus, in the lower second vaporization chamber 7, the pressure P2 is maintained, as well as the temperature T2.

Next, this second metal vapor produced as explained above in said lower second vaporization chamber 7, possibly with inert gas admixtured thereto as explained above, flows past the buffer 22a into the left end in the figure of the communicating conduit 22, and then flows through said conduit 22 in the rightwards direction in the figure, into the condensation chamber 24. This second vapor is then cooled inside the condenser 23 to form a liquid, and then solid metal is deposited out as adhering to the inner walls of the condenser 23. When the amount of this solid metal has reached a predetermined amount, by the operation of the third heater 29, it is melted and trickles down to the bottom of the condenser 23, to form a pool 30 of molten metal which consists essentially only of the metal to be recovered. Optionally, under the control of the control valve 32, this molten metal pool 30 may be drained through the discharge conduit 33, without substantially disturbing the evacuated condition of the condensation chamber 24 and of the apparatus as a whole.

First Operational Example

The metal distillation apparatus according to the first preferred embodiment of the present invention described above and shown in FIG. 1 was used for separating and recovering magnesium from a magnesium-lead alloy containing 10% by weight of magnesium and remainder lead. No inert gas was admixed through the port 12, and the operational conditions were as follows: in the upper first vaporization chamber 6, the temperature T1 was approxiamtely 900° C. and the pressure P1 was approximately 1 torr; in the lower second vaporization chamber 7, the temperature T2 was approximately 700° C. and the pressure P2 was approximately 0.3 torr; and, in the condensation chamber 24 of the condenser 23, the temperature T3 was approximately 200° C. and the pressure P3 was approximately 0.3 torr.

By performing the above detailed operation, magnesium metal of purity about 99.7% by weight was obtained. For collecting about 3 kg of magnesium of this purity level, a time of about 1 hour was required.

First Comparison Example

By comparison to this case, by using a prior art method and device for separating and recovering magnesium from a magnesium - lead alloy containing 10% by weight of magnesium and remainder lead, with operational conditions being that in the interior of the vaporization apparatus the temperature t1 was approximately 700° C. and the pressure p1 was approximately 0.3 torr, and in the interior of the condenser the temperature t2 was approximately 200° C. and the pressure p2 was approximately 0.3 torr, it was discovered that the purity of the recovered magnesium metal was about 97% by weight, and that for collecting about 1 kg of magnesium of this purity level a time of about 7 hours was required. Thus, this comparison example shows that the method and the device of the present invention are particularly effective for collecting a metal to be recovered with high efficiency at a high degree of purity.

Second Comparison Example

As a second comparison example, by using the same prior art method and device for separating and recovering magnesium from a magnesium - lead alloy containing 10% by weight of magnesium and remainder lead, with operational conditions now being that in the interior of the vaporization apparatus the temperature t1 was approximately 900° C. and the pressure p1 was approximately 0.5 torr, and in the interior of the condenser the temperature t2 was approximately 200° C. and the pressure p2 was approximately 0.5 torr, it was discovered that the purity of the recovered magnesium metal was in this case about 90% by weight, and that for collecting about 1 kg of magnesium of this purity level a time of about 0.4 hours was required. Thus, this comparison example shows that by raising the temperature t1 the time taken for the prior art distillation method was reduced but the purity of the resulting product was deteriorated, and again highlights the particular effectiveness of the method and the device of the present invention for collecting a metal to be recovered with high efficiency at a high degree of purity.

Second Operational Example

The metal distillation apparatus according to the first preferred embodiment of the present invention described above and shown in FIG. 1 was used for separating and recovering magnesium from a magnesium - lead alloy containing, this time, only 5% by weight of magnesium, and remainder lead. No inert gas was admixed through the port 12, and the operational conditions were as before: in the upper first vaporization chamber 6, the temperature T1 was approximately 900° C. and the pressure P1 was approximately 1 torr; in the lower second vaporization chamber 7, the temperature T2 was approximately 700° C. and the pressure P2 was approximately 0.3 torr; and, in the condensation chamber 24 of the condenser 23, the temperature T3 was approximately 200° C. and the pressure P3 was approximately 0.3 torr.

By preforming the above detailed operation, again, magnesium metal of purity about 99.7% by weight was obtained. For collecting this time only about 1 kg of magnesium of this purity level, again a time of about 1 hour was required.

Third Comparison Example

By comparison to this case, as a third comparison example, by using a prior art method and device for separating and recovering magnesium from this magnesium - lead alloy containing 5% by weight of magnesium and remainder lead, with operational conditions again as before in the first comparison example being that in the interior of the vaporization apparatus the temperature t1 was approximately 700° C. and the pressure p1 was approximately 0.3 torr, and in the interior of the condenser the temperature t2 was approximately 200° C. and the pressure p2 was approximately 0.3 torr, it was discovered that the purity of the recovered magnesium metal was this time only about 86% by weight, and that for collecting about 1 kg of magnesium of this purity level a time of about 20 hours was required. Thus, this third comparison example shows that the method and the device of the present invention are much better than the prior art for collecting a metal to be recovered with high efficiency at a high degree of purity, when the concentration of said metal to be recovered is initially rather low.

Fourth Comparison Example

As a fourth comparison example, by using the same prior art method and device for separating and recovering magnesium from this same magnesium - lead alloy containing 5% by weight of magnesium and remainder lead, with operational conditions as in the second comparison example being that in the interior of the vaporization apparatus the temperature t1 was approximately 900° C. and the pressure p1 was approximately 0.5 torr, and in the interior of the condenser the temperature t2 was approximately 200° C. and the pressure p2 was approximately 0.5 torr, it was discovered that the purity of the recovered magnesium metal was in this case rather low, being only about 74% by weight, and that for collecting about 1 kg of magnesium of this purity level a time of about 1.5 hours was required. Thus, this fourth comparison example shows that by raising the temperature t1 in the low desired metal concentration case the time taken for the prior art distillation method was reduced but the purity of the resulting product was very much deteriorated, and again highlights the particular effectiveness of the method and the device of the present invention for collecting a metal to be recovered with high efficiency at a high degree of purity, when the concentration of said metal to be recovered is initially rather low.

Third Operational Example

The metal distillation apparatus according to the first preferred embodiment of the present invention described above and shown in FIG. 1 was used for separating and recovering magnesium from a magnesium - lead alloy containing 10% by weight of magnesium and remainder lead. In this case, a supply of inert gas was admixed through the port 12, being argon and being supplied at a flow rate of 100 l/h, and the operational conditions were as follows: in the upper first vaporization chamber 6, the temperature T1 was approximately 900° C. and the pressure P1 was approximately 3 torr; in the lower second vaporization chamber 7, the temperature T2 was approximately 700° C. and the pressure P2 was approximately 0.2 torr; and, in the condensation chamber 24 of the condenser 23, the temperature T3 was approximately 200° C. and the pressure P3 was approximately 0.2 torr.

By performing the above detailed operation, magnesium metal of purity about 99.8% by weight was obtained. For collecting about 4 kg of magnesium of this purity level, a time of about 1 hour was required.

Thus, this third operational example shows that by supplying inert gas at a certain appropriate flow rate the effectiveness of the present invention is further heightened and its efficiency increased, and again highlights the particular effectiveness of the method and the device of the present invention over the prior art for collecting a metal to be recovered with high efficiency at a high degree of purity.

FOURTH OPERATIONAL EXAMPLE

In order to test the case in which the metal mixed with the magnesium metal to be recovered was different from lead, the metal distillation apparatus according to the first preferred embodiment of the present invention described above and shown in FIG. 1 was used for separating and recovering magnesium from a magnesium - bismuth alloy containing 10% by weight of magnesium and remainder bismuth. No inert gas was admixed through the port 12, and the operational conditions were as follows: in the upper first vaporization chamber 6, the temperature T1 was approximately 950° C. and the pressure P1 was approximately 1 torr; in the lower second vaporization chamber 7, the temperature T2 was approximately 730° C. and the pressure P2 was approximately 0.2 torr; and, in the condensation chamber 24 of the condenser 23, the temperature T3 was approximately 200° C. and the pressure P3 was approximately 0.2 torr.

By performing the above detailed operation, magnesium metal of purity about 99.9% by weight was obtained. For collecting about 2.5 kg of magnesium of this purity level, a time of about 1 hour was required.

Fifth Comparison Example

By comparison to this case, by using the abovementioned prior art method and device for separating and recovering magnesium from a magnesium - bismuth alloy containing 10% by weight of magnesium and remainder bismuth, with operational conditions being that in the interior of the vaporization apparatus the temperature t1 was approximately 950° C. and the pressure p1 was approximately 0.2 torr, and in the interior of the condenser the temperature t2 was approximately 200° C. and the pressure p2 was approximately 0.2 torr, it was discovered that the purity of the recovered magnesium metal was only about 80% by weight, and that for collecting about 1 kg of magnesium of this purity level a time of about 0.4 hours was required. Thus, this comparison example shows that the method and the device of the present invention are effective and distinguished for collecting a metal to be recovered with high efficiency at a high degree of purity, whatever may be the other elements admixtured therewith.

Variant Embodiments

Figure 2:
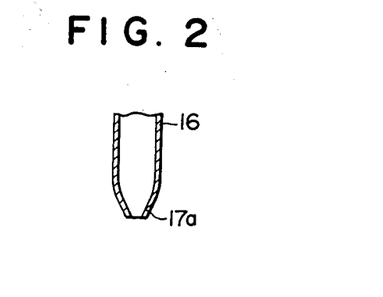
FIG. 2 is a longitudinal sectional view of a convergent nozzle utilized in place of said fan shaped nozzle, in a variant apparatus embodiment, for performing certain variant method embodiments.

Repeat experiments to the ones already performed according to the method of the present invention using the FIG. 1 apparatus were performed, except that in each case, attached to the lower end of the communicating conduit 16, in place of the fan shaped nozzle 17 of the FIG. 1 apparatus, there was utilized the convergent nozzle shown in longitudinal cross section in FIG. 2. In each of these corresponding experiments, a quantity of magnesium of essentially the same purity as detailed above was recovered; however, in each case, the time taken to recover the same unit weight was slightly longer. Thus, it is seen that the use of a fan shaped nozzle such as that shown in FIG. 1 is preferable but not essential for the present invention.

The Second Apparatus Embodiment

Figure 3:
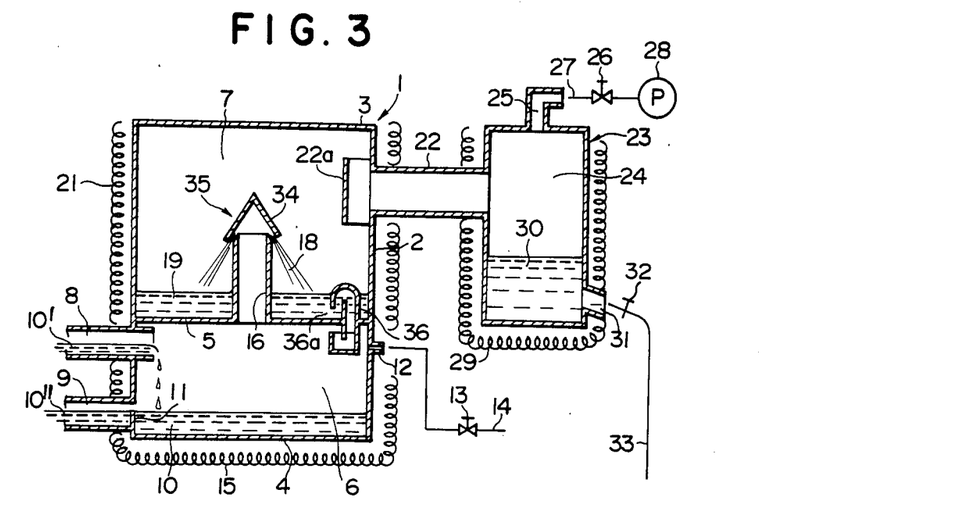
FIG. 3 is a schematic vertical sectional view of the second preferred embodiment of the apparatus aspect of the present invention, which incorporates a reversed arrangement for the first and second vaporization chambers thereof.

In FIG. 3, there is shown a schematic vertical sectional view of the second preferred embodiment of the apparatus aspect of the present invention. In this figure, parts which correspond to parts of the first preferred embodiment shown in FIG. 1, and which have the same functions, are denoted by the same reference numerals.

This second preferred embodiment is similar to the first preferred embodiment, except for the fact that the first vaporization chamber 6 is now positioned below the second vaporization chamber 7; in other words, the positions of the first and second vaporization chambers 6 and 7 are interchanged. In detail, the housing 1 has a cylindrical side wall portion 2, a ceiling wall portion 3 which seals the top end of said cylindrical wall portion 2, and a bottom wall portion 4 which seals the bottom end of said cylindrical wall portion 2. The internal space thus defined within the housing 1 is divided by a separation wall 5 into a lower chamber 6, hereinafter termed the first vaporization chamber, and an upper chamber 7, hereinafter termed the second vaporization chamber. Thus, the separation wall 5 defines the upper boundary of said first vaporization chamber 6 and the lower boundary of said second vaporization chamber 7. The first vaporization chamber 6 again is smaller in volume than the second vaporization chamber 7.

As before, into the lower first vaporization chamber 6 there open a molten alloy introduction port 8 at an upper portion thereof, and a molten alloy discharge port 9 at a lower portion thereof, said ports 8 and 9 being formed integrally with the side wall portion 2 of the housing 1. Again, a dam member 11 is provided at the point where said molten alloy discharge port 9 opens to the first vaporization chamber 6. As before, during use of this apparatus, molten alloy 10' is introduced into the first vaporization chamber through the molten alloy introduction port 8, and drips down thereinto to form a pool 10 of molten alloy material as shown in the figure. Then, particularly in the case that the concentration of the metal which is desired to be recovered in said molten alloy 10 is low and therefore the concentration of non desired impurities in said molten alloy 10 is high, the molten alloy in this pool 10 overflows over the dam member 11 and enters into the molten alloy discharge port 9, to pass to the outside.

In the upper side of the part of the cylindrical wall 2 which defines the side wall portion of the lower first vaporization chamber 6 there is formed an inert gas introduction port 12, to which a conduit 14 is connected; this conduit is controlled by a flow control valve 13 fitted at an intermediate point thereof. Thus this construction is similar to that of the first preferred embodiment, but positioned differently; and its function is similar. As before, a first heater 15 is arranged around the circumferential side wall and around the bottom of the first vaporization chamber 6, said first heater 15 providing a means for heating up said first vaporization chamber 6 and the molten alloy pool 10 received therein to a temperature T1 which will be defined later, and for maintaining said chamber 6 and said alloy pool 10 at said temperature T1, by which means a first metal vapor (not shown) is created within the lower first vaporization chamber 6.

Through the separation wall 5 which divides the lower first vaporization chamber 6 from the upper second vaporization chamber 7, there is formed an aperture in which there is integrally set a communicating conduit 16. The upper end of the communicating conduit 16 projects upwards into the upper second vaporization chamber 7 from its floor and opens at a considerable height therein, substantially higher than the level of any molten alloy pool that may be being held therein as will be explained later. And the lower end of the communication conduit 16 opens at a relatively high point within the lower first vaporization chamber 6. Over the upper end of this communication conduit 16 there is fixed an conical or umbrella shaped member 34, which cooperates with the end of said conduit 16 to define an umbrella shaped nozzle 35 the direction of the flow from which is downwards in the figure even though the flow through the conduit 16 is upwards. Thus, the communicating conduit 16 and the nozzle 35 together define a constricted conduit means. The first metal vapor (not shown) produced as explained above in the lower first vaporization chamber 6 flows, possibly with the admixture thereto of a flow of an inert gas such as argon injected as explained above through the inert gas introduction port 12 into said first vaporization chamber 6, into the lower end of the communicating conduit 16, and then flows through said conduit 16 in the upwards direction in the figure, while undergoing adiabatic expansion. This flow of metal vapor and possibly inert gas admixed thereto then passes through the umbrella shaped nozzle 35, undergoing further and rapid adiabatic expansion as it does so, and sprays from said umbrella shaped nozzle 17 into the upper second vaporization chamber 7 as a jet spray flow 18 which is directed downwards at the partition wall 5 forming the floor of the second vaporization chamber 7. During this further rapid adiabatic expansion of the flow of metal vapor and possibly inert gas admixed thereto through the umbrella shaped nozzle 35, the metal vapor thereof is as before cooled rapidly to a liquid spray form, said liquid spray having a larger concentration of the metal which is desired to be recovered and therefore a smaller concentration of non desired impurities, as compared with the alloy originally introduced to the lower first vaporization chamber 6 through the molten alloy introduction port 8; in other words, the alloy of the spray 18 is enriched.

This enriched liquid alloy collects in a molten pool 19 at the bottom portion of the upper second vaporization chamber 7. A substantially C-shaped transfer conduit 36 is provided as opening between the upper second vaporization chamber 7 and the lower first vaporization chamber 6, for recirculating the molten alloy in the pool 19 in said upper second vaporization chamber 7 into the lower first vaporization chamber 6 to recycle it together with an admixture of fresh alloy as the aforementioned molten alloy supply 10'. The lower end of this conduit 36 opens at a relatively high position in the lower first vaporization chamber 6. As for the upper end 36a of the conduit 36, in the case that the metal to be recovered from the alloy 10 is of higher specific gravity than the remainder thereof, this upper end 36a is located relatively high in the upper second vaporization chamber 7, just below but near the free upper surface of the pool 19 of molten alloy received therein; but, in the alternative case that the metal to be recovered from the alloy 10 is of lower specific gravity than the remainder thereof, this upper end 36a is located relatively low in the upper second vaporization chamber 7, just above the wall member 5 which defines its bottom. As before, a second heater 21 is provided as arranged around the circumferential side wall of the second vaporization chamber 7, and this second heater 21 is arranged to supply a certain fairly moderate required amount of heat to said upper second vaporization chamber 7 and to the molten alloy pool 19 therein, so as to maintain it at a temperature T2 lower than the temperature T1 at which the alloy pool 10 in the lower first vaporization chamber 6 is maintained by the first heater 15, as before. This temperature T2 is enough to vaporize a proportion of said molten alloy pool 19, to form a second vapor (again not particularly shown in the figure). Thus, as before, it is seen that said molten alloy pool 19 at the bottom of the upper second vaporization chamber 7 is supplied with heat from a plurality of sources: first, it receives heat from the jet spray 18, including heat produced by the adiabatic expansion of said jet spray 18 and heat resulting from the passing of the metal vapor included therein from the vapor phase to the liquid phase; secondly, it receives heat produced from the absorption of the kinetic energy of said jet spray 18; and, thirdly, it receives supplemental heat from the second heater 21. Accordingly, it is seen that the heat received by said molten alloy pool 19 from the second heater 21 is only required in a fairly low amount as a supplement, and the power used by the second heater 21 is as in the first preferred embodiment quite low as compared, for instance, with the power used by the first heater 15.

Through the cylindrical wall portion 2 which defines the side of the upper second vaporization chamber 7 there is formed an aperture to which there is integrally connected one end of a communicating conduit 22, the other end of which is connected to an aperture formed in the side of a cylinder condenser 23 and opening to a condensation chamber 24 defined therein at a considerable height in said chamber 24. The construction of this cylindrical condenser 23, and the function thereof, is the same as in the case of the first preferred embodiment, and will not be further descanted upon herein. As before, a buffer 22a is positioned inside the upper second vaporization chamber 7 against said aperture which opens to the communicating conduit 22, so as to prevent any portion of the jet spray 18 from directly entering into said communicating conduit 22; thus, only the aforementioned second vapor, and not the jet spray 18, can enter into said conduit 22 to travel theredown into the condensation chamber 24 of the condenser 23.

Operation of the Second Apparatus Embodiment

The second preferred embodiment of the metal distillation method of the present invention is performed in the manner which will now be described, by using the above described second preferred embodiment of the metal distillation apparatus of the present invention.

First, the control valve 32 for controlling taking out of metal from the condenser 23 is closed, and, in the case of vacuum operation, the control valve 13 for controlling inflow of inert gas is also closed, whereas, in the case of operation with a flow of inert gas such as argon, as before a gas cylinder (not shown) is connected to the end of the conduit 14, and the control valve 13 is properly adjusted to give an appropriate flow of such inert gas. Also, the operation of the vacuum pump 28 is started, and the control valve 26 therefor is regulated, thus exhausting the apparatus through the vapor discharge port 25 and through the conduit 27. In the case of vacuum operation, therefore, the interior of the apparatus soon becomes substantially exhausted of air; while, in the case of operation with a flow of inert gas, such a gas flow through the conduit 14, the inert gas introduction port 21, the first vaporization chamber 6, the connecting conduit 16 and the nozzle 35, the second vaporization chamber 7, the connecting conduit 22, the condensation chamber 24, the vapor discharge port 25 and through the conduit 27 soon becomes established, with the original air in the apparatus having been purged and swept out, and with the pressures in the first vaporization chamber 6, the second vaporization chamber 7, and the condensation chamber 24 respectively being maintained as approximately equal to P1, P2, and P3. And electric power is supplied to the first, second, and third heaters 15, 21, and 29, thus bringing the temperatures in the first vaporization chamber 6, the second vaporization chamber 7, and the condensation chamber 24 respectively to be approximately equal to T1, T2, and T3.

Next, a quantity 10' of molten metal alloy, containing a certain concentration of the first metal which it is desired to recover and also containing a certain concentration of a second element of lower vapor pressure than said first metal, is introduced into the first vaporization chamber through the molten alloy introduction port 8, and drips down thereinto to form a pool 10 of molten alloy material as shown in the figure. This pool 10 is heated by the action of the first heater 15 to the temperature T1, and evolves a first metal vapor, which has a higher percentage concentration of said first metal which it is desired to recover than did the original molten metal alloy. This first metal vapor, if in fact inert gas is passing through the inert gas introduction port 12 into the first vaporization chamber 6, mixes with said inert gas to form a mixture at a proportion determined by the flow volume determined by the setting of the flow control valve 13. Thus, in the lower first vaporization chamber 6, the pressure P1 is maintained, as well as the above mentioned temperature T1. The first metal vapor then (possibly with the admixture thereto of the above mentioned flow of inert gas) flows into the lower end of the communicating conduit 16, and then flows through said conduit 16 in the upwards direction in the figure while undergoing adiabatic expansion. This flow of metal vapor and possibly inert gas admixed thereto then passes through the umbrella shaped nozzle formation 35, undergoing further and rapid adiabatic expansion as it does so, and sprays from said umbrella shaped nozzle 35 into the upper second vaporization chamber 7 as the jet spray flow 18 which is directed downwards by the conical umbrella shaped memer 34. During this further rapid adiabatic expansion of this flow of metal vapor and possibly inert gas admixed thereto through the umbrella shaped nozzle 35, the metal vapor thereof is cooled rapidly to a liquid spray form, said liquid spray, like the first vapor from which it is formed, having a larger concentration of the metal which is desired to be recovered, and therefore a smaller concentration of non desired impurities, as compared with the alloy 10' originally introduced to the first vaporization chamber 6 through the molten alloy introduction port 8; in other words, the alloy of the spray 18 is enriched.

This enriched liquid alloy strikes against the bottom wall 5 of the upper second vaporization chamber 7, or against an already collected molten pool 19 of said liquid alloy at the bottom portion of said upper second vaporization chamber 7. The sensible heat evolved by the molten alloy 19 as it converts from the liquid phase in the first vaporization chamber 6 to the liquid phase in the second vaporization chamber 7 becomes the principal source of heat for vaporizing this pool 19 of molten alloy, and thus a certain amount of said pool 19 of molten alloy is reconverted into vapor, to form a second vapor in the upper second vaporization chamber 7. However, some heating assistance is also required from the second heater 21 for forming this second vapor; and some contribution is as mentioned above received from the heat produced from the absorption of the kinetic energy of the jet spray 18. And this second vapor has an even higher concentration of the metal which is desired to be recovered, and therefore an even smaller concentration of non desired impurities. The remainder of the matter in the molten alloy pool 19, overflows through the C-shaped transfer conduit 36 provided as opening between the upper second vaporization chamber 7 and the lower first vaporization chamber 6, when said pool 19 becomes full enough for its level to go over the level of the upper elbow portion of said conduit 36. Thus the molten alloy in the pool 19 in the upper second vaporization chamber 7 is recirculated into the lower first vaporization chamber 6 to recycle it together with an admixture of fresh alloy as the aforementioned molten alloy supply 10'. The upper end 36a of the conduit 36, in the case that the metal to be recovered from the alloy 10 is of higher specific gravity than the remainder thereof, is located relatively high in the upper second vaporization chamber 7, just below but near the free upper surface of the pool 19 of molten alloy received therein, so as to pick up for recirculation as little as possible of said metal to be recovered and as much of the other impurities mixed therewith as possible; but, in the alternative case that the metal to be recovered from the alloy 10 is of lower specific gravity than the remainder thereof, this upper end 36a is located relatively low in the upper second vaporization chamber 7, just above the wall member 5 which defines its bottom, again so as to pick up for recirculation as little as possible of said metal to be recovered and as much of the other impurities mixed therewith as possible. And, in the upper second vaporization chamber 7, the pressure P2 is maintained, as well as the temperature T2.

Next, this second metal vapor produced as explained above in said upper second vaporization chamber 7, possibly with inert gas admixtured thereto as explained above, flows past the buffer 22a into the left end in the figure of the communicating conduit 22, and then flows through said conduit 22 in the rightwards direction in the figure, into the condensation chamber 24. This second vapor is then cooled inside the condenser 23 to form a liquid, and then solid metal is deposited out as adhering to the inner walls of the condenser 23. When the amount of this solid metal has reached a predetermined amount, by the operation of the third heater 29, it is melted and trickles down to the bottom of the condenser 23, to form a pool 30 of molten metal which consists essentially only of the metal to be recovered. Optionally, under the control of the control valve 32, this molten metal pool 30 may be drained through the discharge conduit 33, without substantially disturbing the evacuated condition of the condensation chamber 24 and of the apparatus as a whole. This operation of the condenser 23 is quite the same, as in the first preferred embodiment described above.

Fifth Operational Example

The metal distillation apparatus according to the second preferred embodiment of the present invention described above and shown in FIG. 3 was used for separating and recovering magnesium from a magnesium - lead alloy containing 10% by weight of magnesium and remainder lead. No inert gas was admixed through the port 12, and the operational conditions were as follows: in the lower first vaporization chamber 6, the temperature T1 was approximately 910° C. and the pressure P1 was approximately 1.2 torr; in the upper second vaporization chamber 7, the temperature T2 was approximately 700° C. and the pressure P2 was approximately 0.2 torr; and, in the condensation chamber 24 of the condenser 23, the temperature T3 was approximately 200° C. and the pressure P3 was approximately 0.2 torr.

By performing the above detailed operation, magnesium metal of purity about 99.6% by weight was obtained. For collecting about 3.5 kg of magnesium of this purity level, a time of about 1 hour was required.

By contrasting this performance with the first and second comparison examples of prior art metal distillation described above with reference to the first preferred embodiment, it will be seen that the method and the device of the second preferred embodiment of the present invention as described above with reference to FIG. 3 are particularly effective for collecting the metal to be recovered with high efficiency at a high degree of purity.

Sixth Operational Example

The metal distillation apparatus according to the second preferred embodiment of the present invention described above and shown in FIG. 3 was used for separating and recovering magnesium from a magnesium - lead alloy containing, this time, only 5% by weight of magnesium, and remainder lead. No inert gas was admixed through the port 12, and the operational conditions were as before: in the upper first vaporization chamber 6, the temperature T1 was approximately 910° C. and the pressure P1 was approximately 1.2 torr; in the lower second vaporization chamber 7, the temperature T2 was approximately 700° C. and the pressure P2 was approximately 0.2 torr; and, in the condensation chamber 24 of the condenser 23, the temperature T3 was approximately 200° C. and the pressure P3 was approximately 0.2 torr.

By performing the above detailed operation, again, magnesium metal of purity about 99.6% by weight was obtained. For collecting this time only about 1 kg of magnesium of this purity level, a time of about 0.8 hour was required.

By contrasting this performance with the third comparison example of prior art metal distillation described above with reference to the first preferred embodiment, it will be seen that the method and the device of the second preferred embodiment of the present invention as described above with reference to FIG. 3 are particularly effective for collecting the metal to be recovered with high efficiency at a high degree of purity, even when the concentration of said metal to be recovered in the raw material is rather low.

Seventh Operational Example

The metal distillation apparatus according to the second preferred embodiment of the present invention described above and shown in FIG. 3 was used for separating and recovering magnesium from a magnesium - lead alloy containing 10% by weight of magnesium and remainder lead. In this case, a supply of inert gas was admixed through the port 12, being argon and being supplied at a flow rate of 120 l/h, and the operational conditions were as follows: in the upper first vaporization chamber 6, the temperature T1 was approximately 900° C. and the pressure P1 was approximately 3 torr; in the lower second vaporization chamber 7, the temperature T2 was approximately 700° C. and the pressure P2 was approximately 0.3 torr; and, in the condensation chamber 24 of the condenser 23, the temperature T3 was approximately 200° C. and the pressure P3 was approximately 0.3 torr.

By performing the above detailed operation, magnesium metal of purity about 99.6% by weight was obtained. For collecting about 4.8 kg of magnesium of this purity level, a time of about 1 hour was required.

Thus, this seventh operational example shows that, in the case of this second preferred embodiment of the present invention also, by supplying inert gas at a certain appropriate flow rate, the effectiveness of the present invention is further heightened and its efficiency increased, and this seventh operational example again highlights the particular effectiveness of the method and the device of the present invention over the prior art for collecting a metal to be recovered with high efficiency at a high degree of purity.

Eighth Operational Example

In order to test the case in which the metal mixed with the magnesium metal to be recovered was different from lead, the metal distillation apparatus according to the second preferred embodiment of the present invention described above and shown in FIG. 3 was used for separating and recovering magnesium from a magnesium - bismuth alloy containing 10% by weight of magnesium and remainder bismuth. No inert gas was admixed through the port 12, and the operational conditions were as follows: in the upper first vaporization chamber 6, the temperature T1 was approximately 930° C. and the pressure P1 was approximately 1 torr; in the lower second vaporization chamber 7, the temperature T2 was approximately 720° C. and the pressure P2 was approximately 0.3 torr; and, in the condensation chamber 24 of the condenser 23, the temperature T3 was approximately 200° C. and the pressure P3 was approximately 0.3 torr.

By performing the above detailed operation, magnesium metal of purity about 99.8% by weight was obtained. For collecting about 2.7 kg of magnesium of this purity level, a time of about 1 hour was required.

Sixth Comparison Example

By comparison to this case, by using the abovementioned prior art method and device for separating and recovering magnesium from a magnesium - bismuth alloy containing 10% by weight of magnesium and remainder bismuth, with operational conditions being that in the interior of the vaporization apparatus the temperature t1 was approximately 930° C. and the pressure p1 was approximately 0.3 torr, and in the interior of the condenser the temperature t2 was approximately 200° C. and the pressure p2 was approximately 0.3 torr, it was discovered that the purity of the recovered magnesium metal was only about 75% by weight, and that for collecting about 2.5 kg of magnesium of this purity level a time of about 1 hour was required. Thus, this comparison example shows that the method and the device according to the shown second preferred embodiment of the present invention are effective and distinguished over the prior art for collecting a metal to be recovered with high efficiency at a high degree of purity, whatever may be the other elements admixtured therewith.

The Third Apparatus Embodiment

Figure 4:
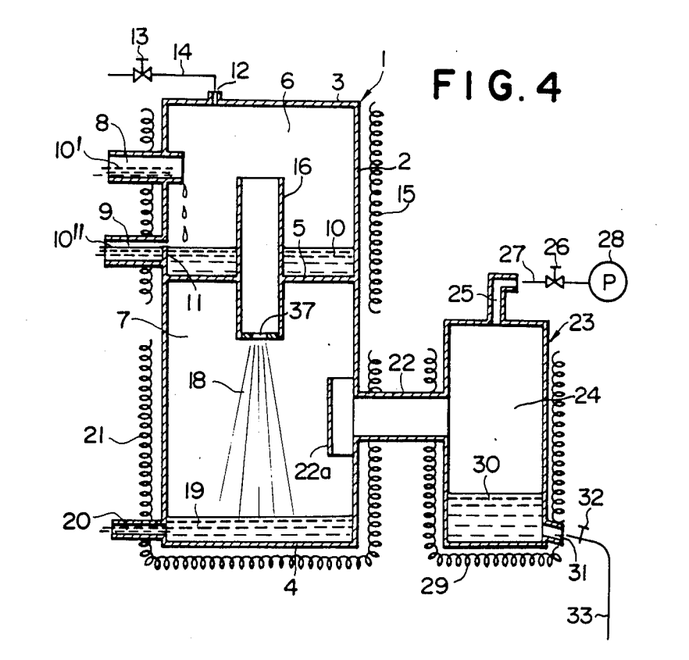
FIG. 4 is a schematic vertical sectional view of the third preferred embodiment of the apparatus aspect of the present invention, which incorporates a non streamlined cylindrically formed nozzle.

In FIG. 4, there is shown a schematic vertical sectional view of the third preferred embodiment of the apparatus aspect of the present invention. In this figure, parts which correspond to parts of the first and second preferred embodiments shown in FIGS. 1 and 2, and which have the same functions, are denoted by the same reference numerals.

This third preferred embodiment is similar to the first preferred embodiment, except for the fact that, at the lower end in the figure of the communicating conduit 16, rather than a flattened fan shaped nozzle 17 being provided as was the case in said first preferred embodiment, there is provided a flat disk 37 with a central hole formed therethrough, as shown in cross section in FIG. 4. In other words, no particular streamlining for the portion of the construction is provided, and thereby turbulence in the communicating conduit 16 and in the jet flow 18 issuing from the hole in the flat disk 37 and squirting into the lower second vaporization chamber 7 is enhanced. In all other respects, the construction and operation of this third preferred embodiment of the metal distilling apparatus according to the present invention, according to a preferred embodiment of the method of the present invention, is the same as in the case of the first preferred embodiment, and accordingly detailed description thereof will be foregone herein, in the interests of brevity of description.

Ninth Operational Example

The metal distillation apparatus according to the third preferred embodiment of the present invention described above and shown in FIG. 4 was used for separating and recovering magnesium from a magnesium - lead alloy containing 8% by weight of magnesium and remainder lead. No inert gas was admixed through the port 12, and the operational conditions were as follows: in the upper first vaporization chamber 6, the temperature T1 was approximately 900° C. and the pressure P1 was approximately 0.8 torr; in the lower second vaporization chamber 7, the temperature T2 was approximately 700° C. and the pressure P2 was approximately 0.3 torr; and, in the condensation chamber 24 of the condenser 23, the temperature T3 was approximately 200° C. and the pressure P3 was approximately 0.3 torr.

By performing the above detailed operation, magnesium metal of purity about 99.5% by weight was obtained. For collecting about 3 kg of magnesium of this purity level, a time of about 1 hour was required. Thus, this operational example again shows that the method and the device of the present invention are particularly effective for collecting a metal to be recovered with high efficiency at a high degree of purity.

According to the above explanation, it is clear that, in contrast to the prior art, the distillation method and the distillation apparatus of the present invention separate and recover the metal desired to be recovered from a metal alloy comprising said metal desired to be recovered and a second element of lower vapor pressure than said metal desired to be recovered more cheaply, efficiently, and at a superior level of purity.

The present invention and a number of its embodiments have been explained above in detail. However, it would be obvious to anybody with reasonable training in the art that there are many additional favorable embodiments and therefore the possible embodiments within the scope of the present invention are not limited to those herein explained. For example, many alloys besides those containing magnesium may be treated. Or the target metal may be collected as liquid in the condensation chamber. Therefore, although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A method for separating a certain metal from a mixture of said certain metal with other elements which have lower vapor pressure values than said certain metal, comprising the steps of:
   (a) heating said mixture in order to partially vaporize said certain metal and said other elements with the result that the composition of the gas mixture generated by said heating is shifted to a mixture substantially enriched in said certain metal as a result of the differences in vapor pressure values of the elements which have been vaporized;
   (b) adiabatically expanding said gas mixture resulting in said gas mixture being substantially liquified;
   (c) allowing the liquified gas to vaporize principally by the heat of the liquified gas, the result of which is that the composition of the gas thus generated is further enriched in the amount of said certain metal because of the differences in vapor pressure value of the components of said liquified gas and also because the composition of the liquified gas is changed from that of the mixture which is originally heated; and
   (d) collecting the gas generated by the vaporization process of step (c) thereby permitting recovery of said certain metal.

2. The method of claim 1, wherein the adiabatic expansion of step (b) of said first generated gas is accomplished by blowing said first generated gas through an expansion nozzle to form a jet flow of said gas, and collecting the expanded liquified gas which results as a bath, said jet flow being blown directly into said bath in order to substantially recover all of the kinetic energy of said jet flow by the liquified gas itself.

3. The method of claim 2, wherein said adiabatic expansion of step (b) of said first generated gas is achieved by a convergent-divergent nozzle.

4. The method of claim 1, wherein said mixture is heated in the form of a molten bath, said bath being gradually supplemented with new supplies of said mixture while a portion of said bath is gradually drained from the bath.

5. The method of claim 4, wherein said portion of said bath being drained is a portion which has a relatively higher density of the elements in said mixture other than said certain metal.

6. The method of claim 2, wherein a portion of the liquified gas as a result of adiabatic expansion is drained from the bath and is recirculated to said mixture being heated in step (a) for reprocessing.

7. The method of claim 6, wherein the portion of the liquified gas being drained is at a lower level of the liquified gas when the certain metal being recovered has a lower specific weight than the other elements in said mixture.

8. The method of claim 6, wherein the portion of the liquified gas being drained is at a higher level of the liquified gas when the certain metal has a higher specific weight than the other elements in said mixture.

* * * * *